(12) United States Patent
Takeuchi

(10) Patent No.: US 6,421,488 B1
(45) Date of Patent: Jul. 16, 2002

(54) PHOTON BEAM GENERATOR

(75) Inventor: Shigeki Takeuchi, Amagasaki (JP)

(73) Assignee: Japan Science and Technology Corporation (JP); a part interest ( * ) Notice: Subject to any disclaimer, the term of this patent is extended or adjusted under 35 U.S.C. 154(b) by 0 days.

(21) Appl. No.: 09/380,053

(22) PCT Filed: Dec. 21, 1998

(86) PCT No.: PCT/JP98/05771

§ 371 (c)(1),
(2), (4) Date: Nov. 23, 1999

(87) PCT Pub. No.: WO99/32933

PCT Pub. Date: Jul. 1, 1999

(30) Foreign Application Priority Data

Dec. 22, 1997 (JP) .............................. 9-353078

(51) Int. Cl.[7] .............................. G02B 6/00; G02F 1/35
(52) U.S. Cl. ........................................ 385/122; 359/330
(58) Field of Search ........................... 385/122; 359/330

(56) References Cited

U.S. PATENT DOCUMENTS

| 4,805,997 | A | * | 2/1989 | Asahara et al. | ............. | 350/413 |
| 4,880,996 | A | * | 11/1989 | Peterson et al. | ............ | 307/425 |
| 4,947,640 | A | * | 8/1990 | Few et al. | .................. | 60/39.06 |
| 5,418,905 | A | * | 5/1995 | Rarity et al. | ................ | 359/158 |
| 5,606,453 | A | * | 2/1997 | Walling et al. | ............. | 359/330 |
| 5,796,477 | A | * | 8/1998 | Teich et al. | .................. | 356/318 |

FOREIGN PATENT DOCUMENTS

JP          9-247086        9/1997

OTHER PUBLICATIONS

T. B. Pittman et al., Apr. 1996, Two–photon geometric optics, Physical Review A, vol. 53, No. 4, Translation.
Sergienko et al., May 1995, Experimental evaluation of a two–photon wave packet in type–II parametric downconversion, vol. 12, No. 5/J. Opt. Soc. Am. B, Translation.
Paul G. Kwiat et al., May 1994, Proposal for a loophole–free Bell inequality experiment, Physical Review A, vol. 49, No. 5, Translation.
T. P. Grayson et al., Apr. 1994, Spatial properties of spontaneous parametric down–conversion and their effect on induced coherence without induced emission, Physical Review A, vol. 49, No. 4, Translation.

* cited by examiner

Primary Examiner—John D. Lee
Assistant Examiner—Jerry T Rahll
(74) Attorney, Agent, or Firm—McGlew and Tuttle, P.C.

(57) ABSTRACT

A photon beam generating apparatus comprises an incident pump beam generation section 1 and a photon pair generation section including a non-linear optical medium 3. The angle between the optical axis of the medium 3 and an incident pump beam is set to a value such that tuning curves become tangent to a line corresponding to a wavelength a in order to generate two photon beams including paired photons generated simultaneously and having a wavelength a. Another photon beam generating apparatus comprises an incident pump beam generation section 1 and a photon pair generation section including a non-linear optical medium 3. The angle between the optical axis of the medium 3 and the incident pump beam is set to a value such that tuning curves become tangent to different lines corresponding to wavelengths a and b respectively, in order to generate two photon beams including paired photons generated simultaneously and having wavelengths a and b respectively.

17 Claims, 15 Drawing Sheets

F I G. 7
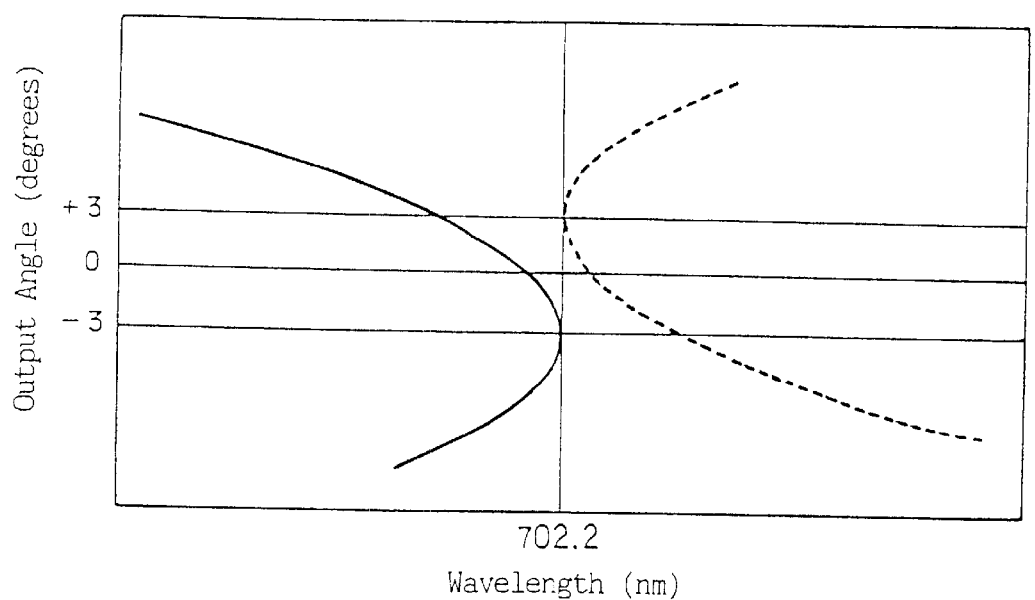

US 6,421,488 B1

PHOTON BEAM GENERATOR

TECHNICAL FIELD

The present invention relates to a photon beam generating apparatus for generating two photon beams containing photons generated simultaneously and constituting a photon pair, and to a photon beam generating apparatus capable of determining the time of generation of the photons included in the photon beams. The photon beam generating apparatus according to the present invention can be used in a quantum cryptographic communications system, a quantum computation system, an analysis system, or a like system.

BACKGROUND ART

If photons constituting a pair can be produced simultaneously, the time and the position at which one of the paired photons is present can be determined through measurement of the other photon. In general, such a pair of photons having high temporal correlation is generated through generation of a parametric fluorescence pair.

A parametric fluorescence pair is constituted of two photons $\hbar\omega_i$ and $\hbar\omega_s$ produced when a photon having an energy of $\hbar\omega_0$ enters a non-linear optical medium. In this case, $\hbar$ represents a value obtained through division of Planck's constant $h=6.62\times10^{-34}$ [j·s] by $2\pi$. $\omega_s$, and $\omega_0$ respectively represent the frequency of a signal beam, the frequency of an idler beam, and the frequency of an incident photon ("signal beam" and "idler beam" are conventional names representing respective photons in each photon pair). Also, according to the law of conservation of energy, the following relation is satisfied:

$$\omega_0=\omega_i+\omega_s. \qquad (1)$$

In addition, the following relation with regard to conservation of momentum is satisfied:

$$\hbar k_0=\hbar k_i+\hbar k_s \qquad (2)$$

where $k_s$, $k_i$, and $k_0$ respectively represent the frequency of the signal beam, the frequency of the idler beam, and the frequency of the incident photon beam. Equations (1) and (2) are called phase-matching conditions. In order to produce parametric fluorescence pairs, the phase-matching conditions must be satisfied within a medium having a sufficient non-linear constant.

FIG. 14 shows an example of a conventional technique utilizing parametric fluorescence pairs described in Sergienko et. al, Journal of Optical Society of America B, May 1995, Vol. 12, No. 5, pp 859, "Experimental Evaluation of a Two-Photon Wave Packet in Type-II Parametric Down-conversion."

In FIG. 14, reference numeral 13 denotes an argon laser, 14 denotes an incident pump beam, 15 denotes a dispersion prism, 25 denotes a BBO crystal, 31 denotes a dispersion prism, and 32 denotes a parametric fluorescence beam. Although the experiment was conducted for measurement of time correlation between produced photons constituting a pair, in FIG. 14, portions other than the portion used for generation of photon beams are omitted for simplicity.

The argon laser 13 produces a single frequency UV laser beam (having a wavelength of 351.1 nm) serving as the incident pump beam 14. The dispersion prism 15 is used for eliminating components other than the component having a wavelength of 351.1 nm from the beam generated by the argon laser. When the incident pump beam 14 enters the BBO crystal 25, parametric fluorescence pairs are produced therein. In the experiment, the angle between the crystal axis of the BBO crystal 25 and the incident pump beam 14 is set at 49.2 degrees in order to satisfy a collinear condition. The collinear condition specifies that the wave number vector of the incident pump beam 14 is parallel with the wave number vectors of the produced fluorescence pairs. The details of the collinear condition will be described in greater detail in the embodiments of the present invention. Because the produced parametric fluorescence beams 32 travel along the axis of the incident pump beam 14, the fluorescence beams 32 are separated from the incident beam 14 by the dispersion prism 31 before being used.

The collinear condition is used not only in the example described above but also in a wide range of experiments related to generation of parametric fluorescence pairs. The reason for this is as follows. When an optical system is constructed, the tilt angles and the positions of optical components are adjusted on the basis of observation of an image of a standard laser beam or an image of the standard laser beam reflected from a surface of each optical component. Generally, since the parametric fluorescence light is of extremely low intensity, a special device such as a cooled CCD must be employed in order to detect the position and the direction of propagation of the produced light. Thus, construction of an experimental system becomes difficult. However, under the collinear condition, a UV pump beam and generated fluorescence pairs propagate collinearly and in the same direction. Consequently, by setting a reference laser beam, which has a wavelength close to that of the fluorescence light, coaxial with the UV pump beam, construction of the experiment system becomes relatively easy.

However, generation of fluorescence pairs under the collinear condition has involved a major drawback. Under the collinear condition, the parametric fluorescence light is emitted over a wide angular range (6.5 degrees in the example). Accordingly, fluorescence pairs radiated in the same direction as the UV pump beam, which are used in the experiment, constitute only a portion of the fluorescence pairs which are actually produced. Consequently, in a conventional optical system:

1. it is difficult to convert the portion of the fluorescence pairs into a beam which has a circular or oval cross-section and which can be used easily;
2. it is difficult to cut out or select a pair of photons radiated in correlated directions; and
3. the quantity of the parametric fluorescence light per unit radiation angle is small.

The reasons for the cause of the above-mentioned difficulties and drawbacks will now be described in detail.

FIG. 15 shows results of calculation performed with regard to the radiation angles of parametric fluorescence pairs under the collinear condition, described in "Proposal for a Loophole-Free Bell Inequality Experiment," Paul G. Kwiat, et. al., Physical Review A, Vol. 49, No. 5, (1994) pp 3209.

FIG. 15 is a plot showing radiation angles of fluorescence pairs with respect to the UV pump beam that enters the crystal in a direction perpendicular to the sheet of FIG. 15 from the back thereof. The optical axis of the crystal is directed upward in FIG. 15. Each hollow triangle indicates the radiation angle of an extraordinary-polarized fluorescence beam and each hollow circle indicates the radiation angle of an ordinary-polarized fluorescence beam. The hollow triangle and the hollow circle are both present at the origin, where the collinear condition is satisfied. As can be seen from the plot, under the collinear condition, the fluorescence pairs are radiated over a wide angular range.

Accordingly, as has been described, in a case where only a portion of the fluorescence pairs radiated in the same direction as the UV pump beam is used, as in conventional experiments, the following difficulties arise.

1. As can be seen from FIG. 15, when fluorescence pairs radiated in the same direction as the UV pump beam are used, the fluorescence pairs are cut out as a portion of an arc as shown in the photographs of FIG. 8. It is difficult to convert the thus-cut-out portion of the fluorescence pairs into a beam having a circular or an oval cross-section without involving a reduction in light intensity. Moreover, if the cut-out portion is converted as such by the use of a suitable pinhole, the number of useable fluorescence pairs decreases due to a loss produced at the pinhole.

2. Photons of a generated fluorescence pair are radiated to positions that are symmetric with respect to the origin in the plot of FIG. 15. Accordingly, in order to obtain paired fluorescence beams each containing most of the generated photons (i.e., having a high correlation), photon pairs must be cut out or selected carefully with attention to their symmetry with respect to the origin, which is a difficult task.

3. For example, in the experiment described in the above-mentioned literature Sergienko et. al, Journal of Optical Society of America B, May 1995, Vol. 12, No. 5, pp 859, "Experimental Evaluation of a Two-photon Wave Packet in Type-II Parametric Downconversion," only 20 fluorescence pairs per second are available. This is mainly because only a portion of the fluorescence pairs that emerged from the crystal can be used.

Conventionally, since a portion of parametric fluorescence pairs which are radiated over a wide angular range is used, it is difficult to convert the portion into a beam having a circular or an oval cross-section, and it is also difficult to cut out or select photons radiated in mutually-correlated directions. Moreover, the light energy of the parametric fluorescence light per unit radiation angle is small.

The present invention has been accomplished in order to solve such problems. An object of the present invention is to produce parametric fluorescence pairs which are radiated within a small solid angle and which can be easily converted into a beam having a circular or an oval cross-section. Another object of the present invention is to increase the quantity of the parametric fluorescence light per unit radiation angle through a decrease in the radiation angle of parametric fluorescence pairs.

DISCLOSURE OF THE INVENTION (1) A photon beam generating apparatus of the present invention comprises an incident pump beam generation section and a photon pair generation section including a non-linear optical medium. The angle between the optical axis of the medium and an incident pump beam is set to a value such that tuning curves become tangent to a line corresponding to a wavelength a in order to generate two photon beams including paired photons generated simultaneously and having a wavelength a.

(2) Another photon beam generating apparatus of the present invention comprises an incident pump beam generation section and a photon pair generation section including a non-linear optical medium. The angle between the optical axis of the medium and the incident pump beam is set to a value such that tuning curves become tangent to different lines corresponding to wavelengths a and b respectively, in order to generate two photon beams including paired photons generated simultaneously and having wavelengths a and b respectively.

(3) Moreover, in addition to the photon pair generation section as described above, the photon beam generating apparatus of the present invention comprises a detection section for detecting one of the produced photons constituting a pair.

(4) Furthermore, in addition to the photon pair generation section as described above, the photon beam generating apparatus of the present invention comprises lenses converging the respective photon beams produced by the photon pair generation section, and optical fibers through which the photon beams propagate.

(5) Still further, in addition to the photon pair generation section as described above, the photon beam generating apparatus of the present invention comprises optical fibers through which the produced photon beams propagate.

The photon beam generating apparatus according to the present invention having the configuration as described above operates as follows.

(1) In the present invention, when an incident pump beam from the incident pump beam generation section enters the photon pair generation section, there are generated two photon beams having a small angular deviation and including paired photons produced simultaneously and each having a wavelength a.

(2) Additionally, in the present invention, when an incident pump beam from the incident pump beam generation section enters the photon pair generation section, there are generated two photon beams having a small angular deviation and including paired photons produced simultaneously and having wavelengths a and b respectively.

(3) Moreover, in the present invention, through detection of one beam including one of the paired photons generated by the photon pair generation section, the time of production of each photon included in the other photon beam is determined.

(4) Furthermore, in the present invention, in order to efficiently transmit photon beams produced by the photon pair generation section to the optical fibers, each of the lenses converges the respective photon beam before the beam enters an optical fiber.

(5) Still further, in the present invention, in order to efficiently transmit photon beams produced by the photon pair generation section to the optical fibers, each of the photon beams enters an optical fiber directly.

BRIEF DESCRIPTION OF THE DRAWINGS

FIG. 7 is a plot showing an example of the relation between radiation angles and wavelengths of fluorescence light according to the present invention.

BEST MODE FOR CARRYING OUT THE INVENTION (1) Embodiment 1

Figure 1:
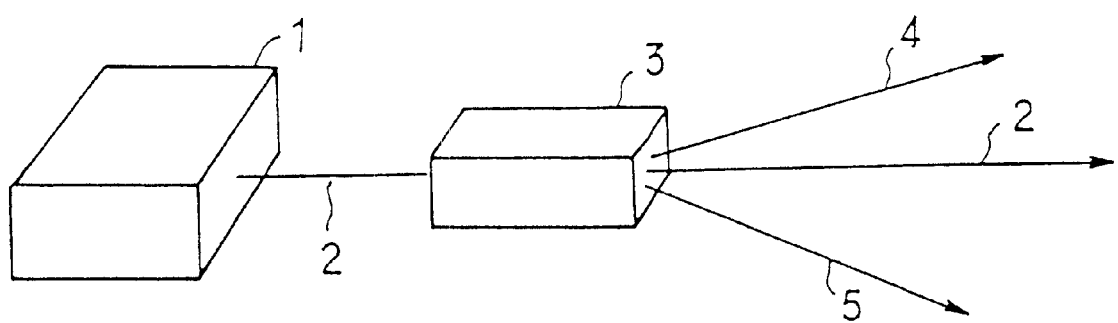
FIG. 1 is a view of the overall configuration of an embodiment of a photon beam generating apparatus according to the present invention.

FIG. 1 shows the overall configuration of an embodiment of a photon beam generating apparatus according to the present invention. In FIG. 1, reference numeral 1 denotes an incident pump beam generation section; reference numeral 2 denotes an incident pump beam radiated from the incident pump beam generation section 1; reference numeral 3 denotes a non-linear optical medium; reference numeral 4 denotes a signal photon beam; and reference numeral 5 denotes an idler photon beam.

Next, the principle of the photon beam generating apparatus of Embodiment 1 will be described with reference to FIG. 2 through FIG. 6. If the non-linear optical medium is a uniaxial crystal, two types of polarization occur; i.e., ordinary polarization and extraordinary polarization. Under ordinary polarization, the refractive index does not vary with the direction of propagation of the light beam. Under extraordinary polarization, the refractive index varies depending on the direction of propagation of a light beam.

Figure 2:
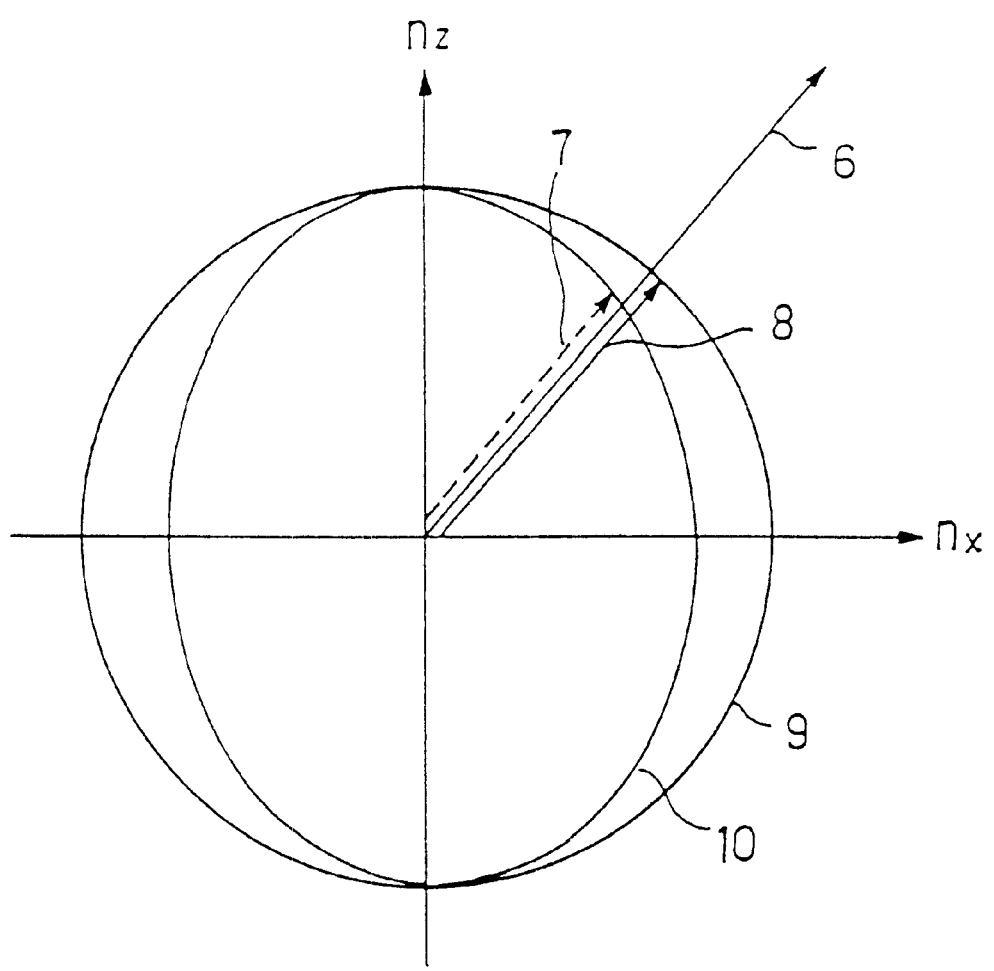
FIG. 2 is an explanatory diagram showing the mechanism of generation of photons in the present invention.

FIG. 2 shows index surfaces of the non-linear optical medium 3 of FIG. 1. In FIG. 2, reference numeral 6 denotes a wave number vector of the incident pump beam, reference numeral 7 denotes a wave number vector of an extraordinary-polarized beam (e-ray), reference numeral 8 denotes a wave number vector of an ordinary-polarized beam (o-ray), reference numeral 9 denotes an index surface of ordinary polarization, and reference numeral 10 denotes an index surface of extraordinary polarization. As can be seen from the phase-matching condition given by Equation (2), a parametric fluorescence pair is produced when the sum of the wave number vector 7 of the extraordinary-polarized beam and the wave number vector 8 of the ordinary-polarized beam becomes equal to the wave number vector 6 of the incident pump beam. As shown in FIG. 2, when the wave number vector of an extraordinary-polarized beam and the wave number vector of an ordinary-polarized beam are directed in the same direction and the phase-matching condition is satisfied, a fluorescence pair called a collinear fluorescence pair is generated. The angle between the optical axis of the non-linear optical medium and the incident pump beam at this time is referred to as a "collinear condition angle." Although FIG. 2 shows the case when the energy of each of paired fluorescence beams is half the energy of the incident pump beam, each of fluorescence beams may have energy not equal to half the energy of the incident pump beam, provided that the above-described equations (1) and (2) are satisfied. Conventionally, as has been described, the collinear condition has been widely employed.

Figure 3:
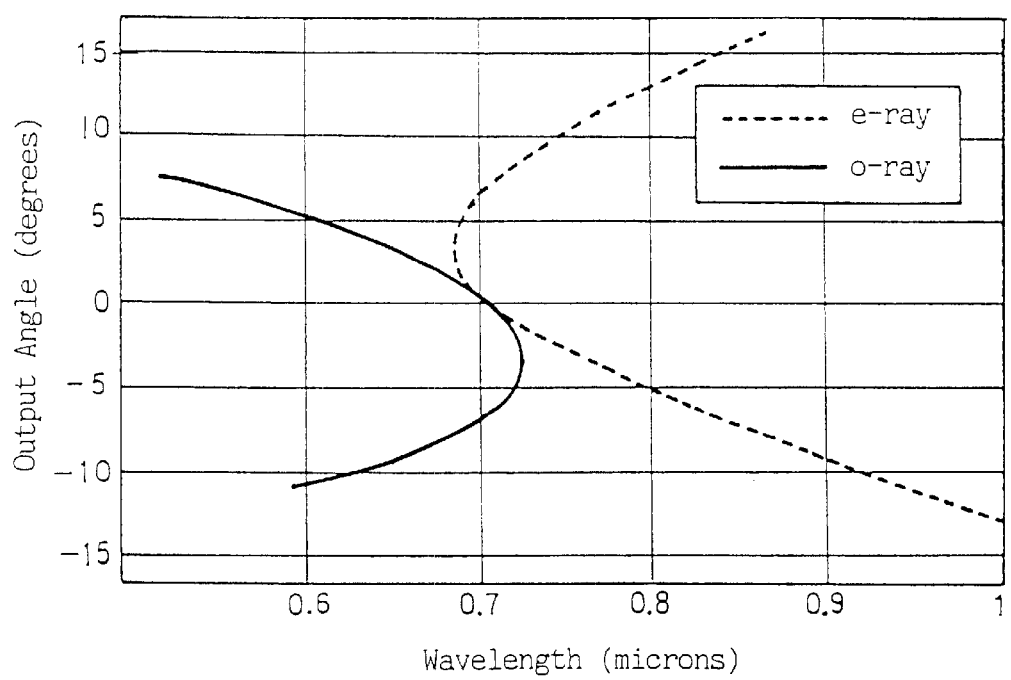
FIG. 3 is a plot showing the relation between radiation angles and wavelengths of fluorescence light under the collinear condition.
Figure 4:
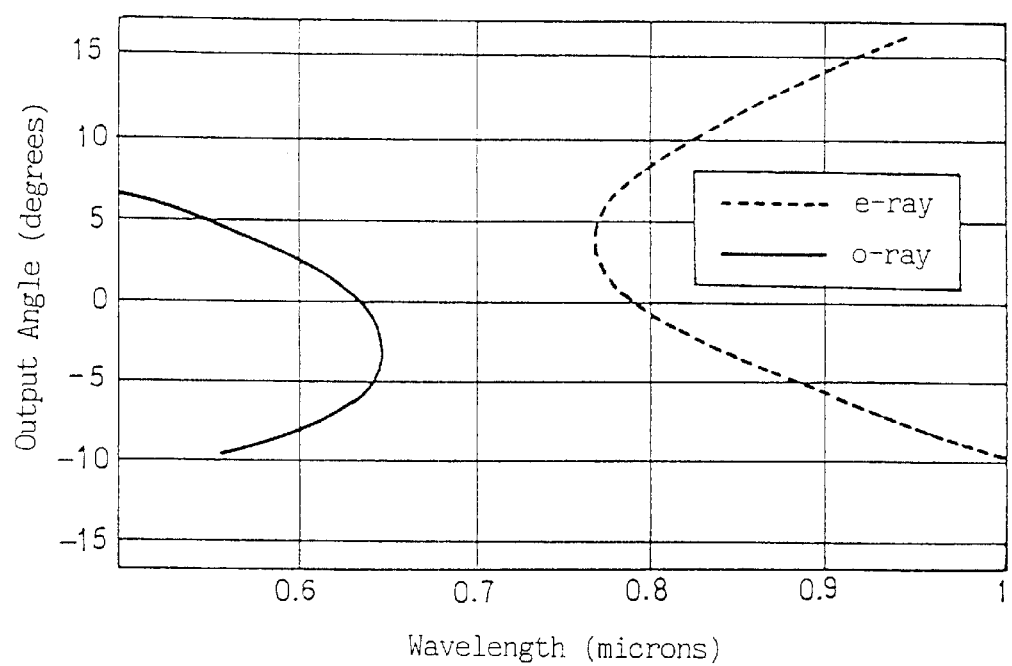
FIG. 4 is a plot showing the relation between radiation angles and wavelengths of fluorescence light when the angle between the optical axis of the crystal and the incident pump beam is smaller than a collinear condition angle.
Figure 5:
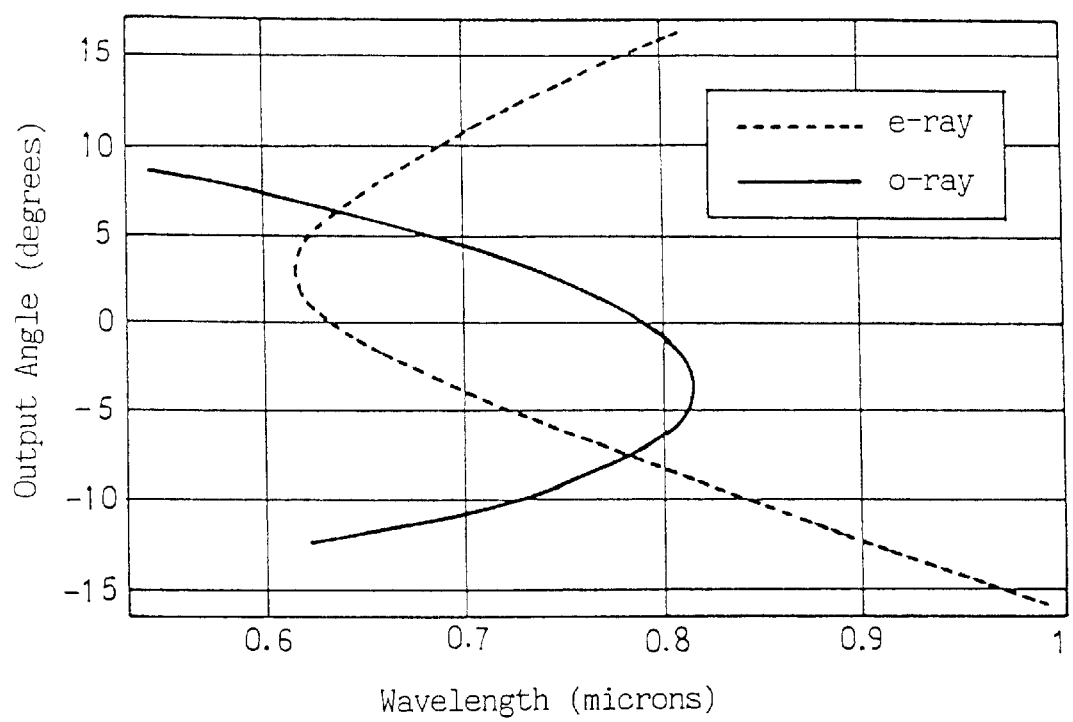
FIG. 5 is a plot showing the relation between radiation angles and wavelengths of fluorescence light when the angle between the optical axis of the crystal and the incident beam is greater than the collinear condition angle.
Figure 6:
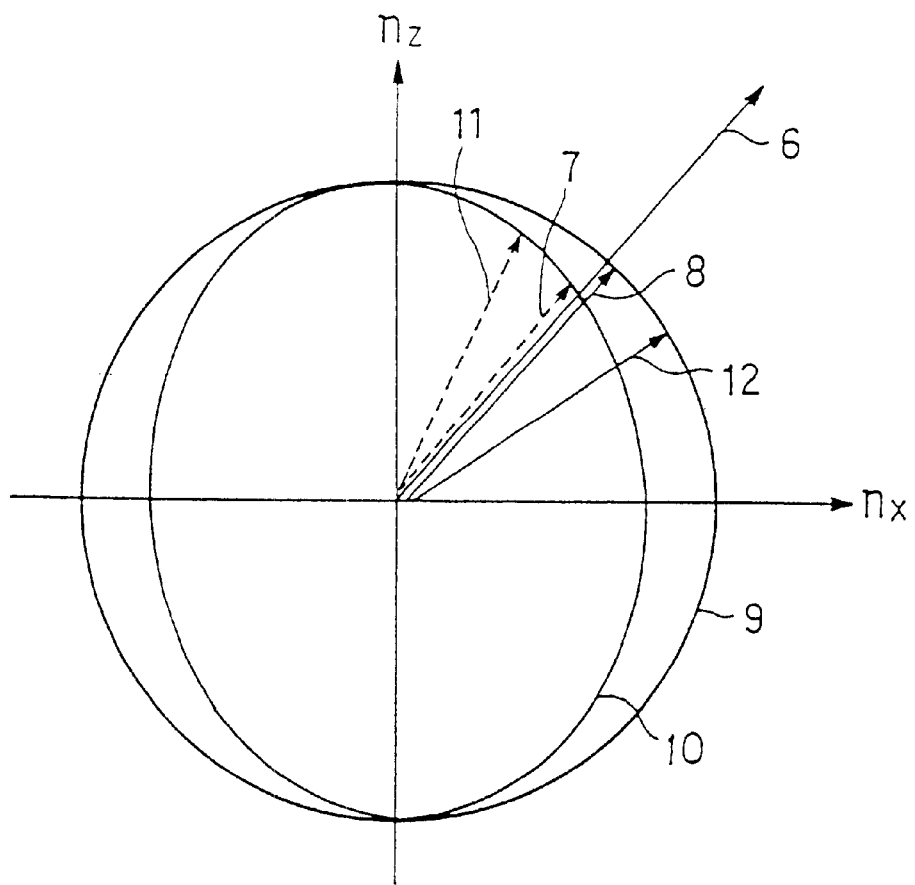
FIG. 6 is an explanatory diagram showing the mechanism of generation of photons in the present invention.

FIGS. 3, 4, and 5 show the results of theoretical calculations conducted by T. B. Pittman and others, with regard to generation of parametric fluorescence beams, described in T. B. Pittman et, al., "Two Photon Geometric Optics," Phys Rev A Vol. 53 No. 4 (1996). In their calculations, a BBO crystal is used as the non-linear optical medium 3 of FIG. 1 and the angle between the optical axis of the crystal and the incident pump beam 2 (having a wavelength of 351.1 nm) of FIG. 1 is set to the collinear condition angle. In FIG. 3, the horizontal axis indicates wavelength (micrometers) and the vertical axis indicates radiation angle (angle between parametric fluorescence beams radiated from the crystal and the incident pump beam). The dotted line shows the case of extraordinary polarization, and the solid line shows the case of ordinary polarization. These curves are called tuning curves. Since the collinear angle is employed in this case, the solid line is tangent to the dotted line at the position where the wavelength is 702.2 mm and the radiation angle is 0 degrees. That is, an extraordinary-polarized beam and an ordinary-polarized beam are radiated in the same direction as the incident pump beam. Additionally, an extraordinary-polarized beam having a wavelength of 702.2 nm is output at 6.5 degrees and the ordinary-polarized beam having a wavelength of 702.2 nm is output at −6.5 degrees. This is because, as can be seen from FIG. 6, not only the collinear paired fluorescence 7 and 8 but also the extraordinary-polarized photon 11 and the ordinary-polarized photon 12 satisfy the phase-matching condition of Equation (2).

FIG. 4 is another example of the calculation results with regard to generation of parametric fluorescence light, which shows the case where the angle between the optical axis of the crystal and the incident pump beam is set to 45.8 degrees, which is smaller than the collinear condition angle (49.2 degrees). In this case, only extraordinary-polarized beams longer than 770 nm in wavelength and ordinary-polarized beams shorter than 650 nm in wavelength are radiated from the crystal. For example, an extraordinary-polarized beam having a wavelength of 790 nm and an ordinary-polarized beam having a wavelength of 630 nm are radiated in the same direction as the incident pump beam.

FIG. 5 shows a further example of the calculation results with regard to generation of parametric fluorescence light, which shows the case where the angle between the optical axis of the crystal and the incident pump beam is set to 52.7 degrees, which is larger than the collinear condition angle (49.2 degrees). In this case, an extraordinary-polarized beam having a wavelength of 702.2 nm is emitted at +11 degrees and −4 degrees, while an ordinary-polarized beam having a wavelength of 702.2 nm is output at +4 degrees and −11 degrees.

As has been described, radiation angles of extraordinary-polarized beams and ordinary-polarized beams vary in accordance with the incident angle of the incident pump beam.

Conventionally, since only a portion of parametric fluorescence light radiated over a wide angular range is used, it is difficult to convert the light into a beam having a circular or an oval-shaped cross-section and to cut out or select photons that are radiated in correlated directions. In order to overcome these difficulties, the present inventors focused on a situation in which the tuning curves for extraordinary polarization and ordinary polarization are tangent to a vertical line corresponding to a wavelength of 702.2 nm, as shown in FIG. 7. In this case, among components of parametric fluorescence light having a wavelength of 702.2 nm, the ordinary-polarized beam is radiated at −3 degrees and the extraordinary-polarized beam is radiated at 3 degrees.

Figure 8A:
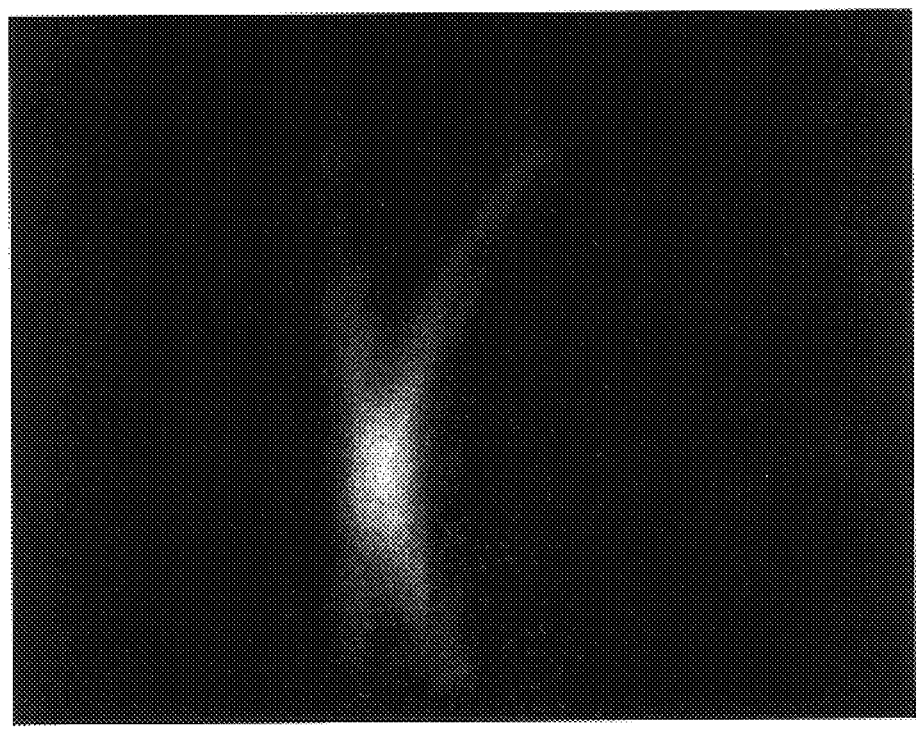
FIGS. 8(a) and 8(b) shows photographs of parametric fluorescence beams satisfying the collinear condition when viewed in a direction opposite the direction of propagation of the incident pump beam.
Figure 8B:
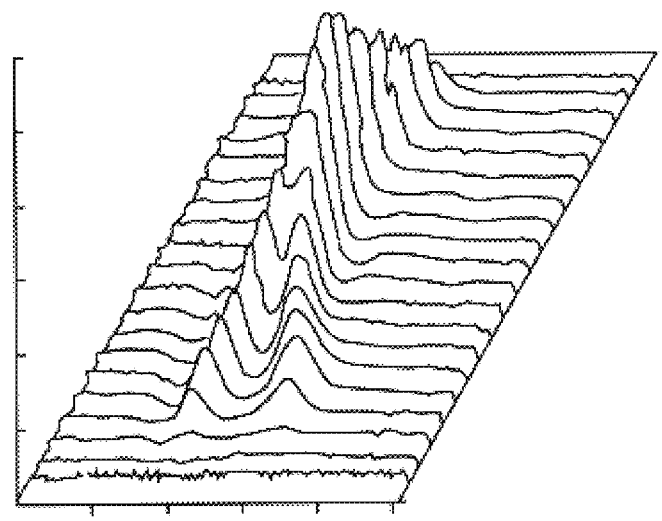
Figure 9A:
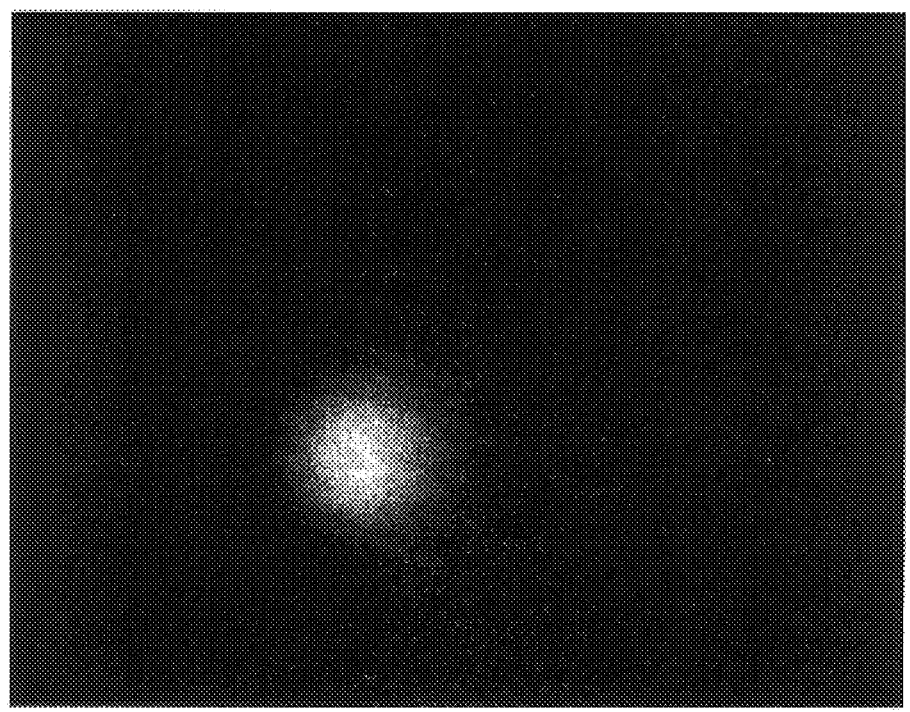
FIGS. 9(a) and 9(b) shows photographs of parametric fluorescence beams generated by the present invention.
Figure 9B:
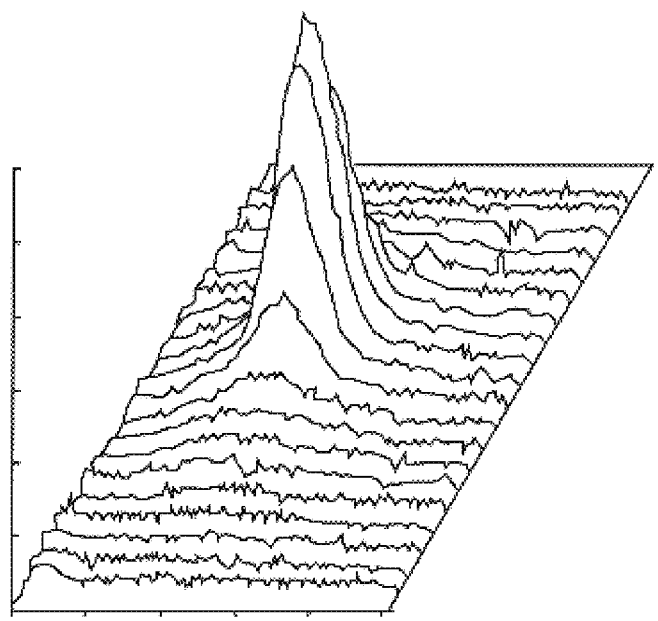

FIGS. 8 and 9 show the results of experiments conducted by the present inventors. FIG. 8 shows photographs of parametric fluorescence pairs radiated in the same direction as the incident pump beam when the angle between the optical axis of the medium and the incident pump beam is set to 49.2 degrees; i.e., the collinear condition angle. This photograph was taken by use of a cooled CCD camera through a filter which allows passage of only light having a wavelength of 702 nm. The photographed range corresponds to a radiation angular range of ±1.5 degrees. In the picture, two arcs are in contact with each other at a single point, where the incident pump beam passes through. From the above, it is apparent that the parametric fluorescence light is radiated over a wide angular range.

FIG. 9 shows photographs of parametric fluorescence light when the angle between the optical axis of the medium and the incident pump beam is set to an angle smaller than 49.2 degrees, such as 47.5 degrees. As can be seen from these photographs, the parametric fluorescence light is actually radiated within a radiation angular range of 0.8 degree. Additionally, in this state, the quantity of light for each of the signal and idler beams is $1.8 \times 10^6$ CPS when the incident pump beam has a light intensity of 0.1 W, provided that there is no absorption by the optical components in course of travel.

As has been described, the inventors have found a novel method in which parametric fluorescence light is caused to radiate within a small radiation angular range through adjustment of the angle between the crystal and the incident pump beam to a specific angle.

Although in the embodiment an argon laser that oscillates at 351.1 nm is used as a light source in the incident pump beam generation section, as a matter of course, a light beam having a different wavelength or a different type of laser light source may be employed.

In addition, although a BBO crystal is used as the non-linear optical medium, a KDP crystal, an organic non-linear optical material and so on may be used. Furthermore, even though a uniaxial crystal is used in the embodiment, a biaxial crystal may be used as the non-linear optical medium.

(2) Embodiment 2

Although Embodiment 1 is directed to the case where both of the tuning curves of extraordinary polarization and ordinary polarization are tangent to a vertical line corresponding to a wavelength of 702.2 nm, the present invention can be applied to the case where each of the tuning curves has a vertex at a different wavelength.

For example, in a case where the tuning curve of extraordinary polarization has a vertex at a wavelength 710 nm and the tuning curve of ordinary polarization has a vertex at a wavelength 694.5 nm, a beam having a wavelength of 710 nm or 694.5 nm is radiated as a single photon beam.

(3) Embodiment 3

Figure 10:
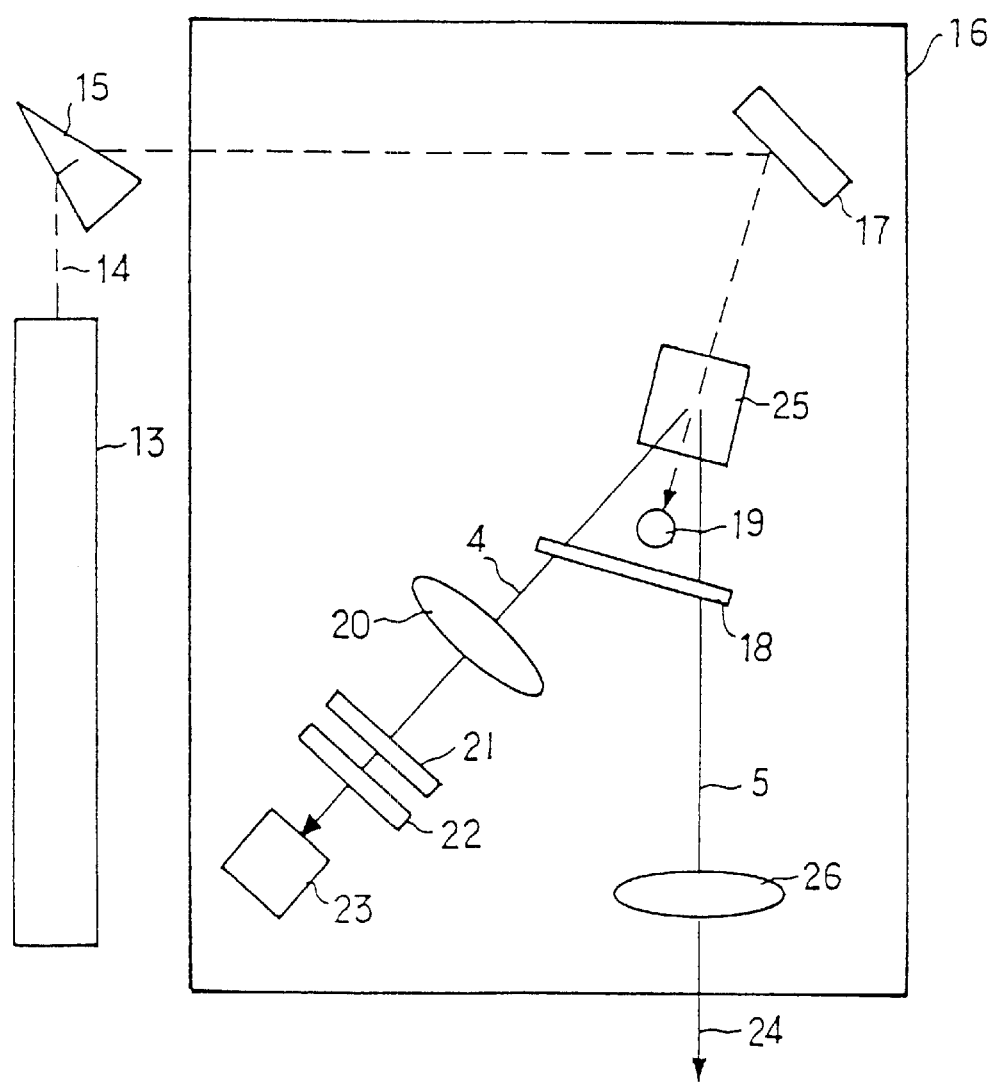
FIG. 10 is a diagram showing the overall configuration of another embodiment of the photon beam generating apparatus according to the present invention.

FIG. 10 shows another embodiment of the present invention. In FIG. 10, reference numeral 13 denotes an argon laser, 14 denotes an incident pump beam, 15 denotes a dispersing prism, 16 denotes a dark box, 17 denotes a mirror, 18 denotes a dichroic mirror, 19 denotes a beam stop, 20 denotes a lens, 21 denotes a short-wavelength-light cut filter, 22 denotes a narrow-band bandpass pass filter, 23 denotes a detector, 24 denotes a single photon beam, 25 denotes a BBO crystal, and 26 denotes a lens.

In this embodiment, the argon laser 13 operates at a single frequency and generates an incident pump beam 14 (351.1 nm) for producing parametric fluorescence light. After noise produced in the laser is eliminated, the incident pump beam 14 is input into the dark box 16. The dark box 16 has a hole for receiving the incident pump beam, as well as a hole for radiating a single-photon beam 24 generated in the dark box. Since parametric fluorescence light is generally weak in intensity, the system is constructed inside the dark box 16 in order to prevent the detector 23 from detecting external light as noise. The radiation direction of the incident pump beam 14 is changed to an arbitrary angular direction by the mirror 17. The radiation direction of the single-photon beam 24 changes in accordance with the angular direction. Then, the incident pump beam 14 enters the BBO crystal 25. The BBO crystal 25 is cut such that the optical axis thereof is directed at an angle suitable for generation of the parametric fluorescence light when the incident pump beam enters the crystal normal to the input face of the crystal. Errors stemming from a machining error at the time of cutting the crystal and measurement conditions such as temperature are corrected by an angle fine-adjustment apparatus attached to the BBO crystal 25. The incident pump beam 14 is absorbed by the beam stop 19 after passing through the BBO crystal 25. Of paired photon beams produced inside the crystal, the signal photon beam 4, after being converged by the lens 20, passes through the short-wavelength-light cut filter 21, which eliminates background noise light within the dark box, and the narrow-band bandpass filter 22, and then enters the detector 23. A multiplier phototube which can count photons may be used as the detector 23. The idler photon beam 5 is passed through the lens 26 in order to be converted into a parallel beam, which is then output from the dark box as a single photon beam 24.

When the single-photon beam 24 was converged on the detector by the use of a lens and a filter, as in the case of the signal photon beam 4, and coincidence counting was performed, the value of the estimated coincidence count was $2.9 \times 10^4$ CPS for the case that the quantum efficiency of the detector was 1. The light intensity of the incident pump beam at this time was approximately 0.3 W. The obtained coincidence counting value was higher than $1.3 \times 10^4$ CPS, which was obtained in a similar experiment performed under the collinear condition and by use of an incident pump beam having light intensity of 0.3 W. That is, a photon beam of strong intensity could be obtained, and the time of generation of the photon beam could be determined.

(4) Embodiment 4

Figure 11:
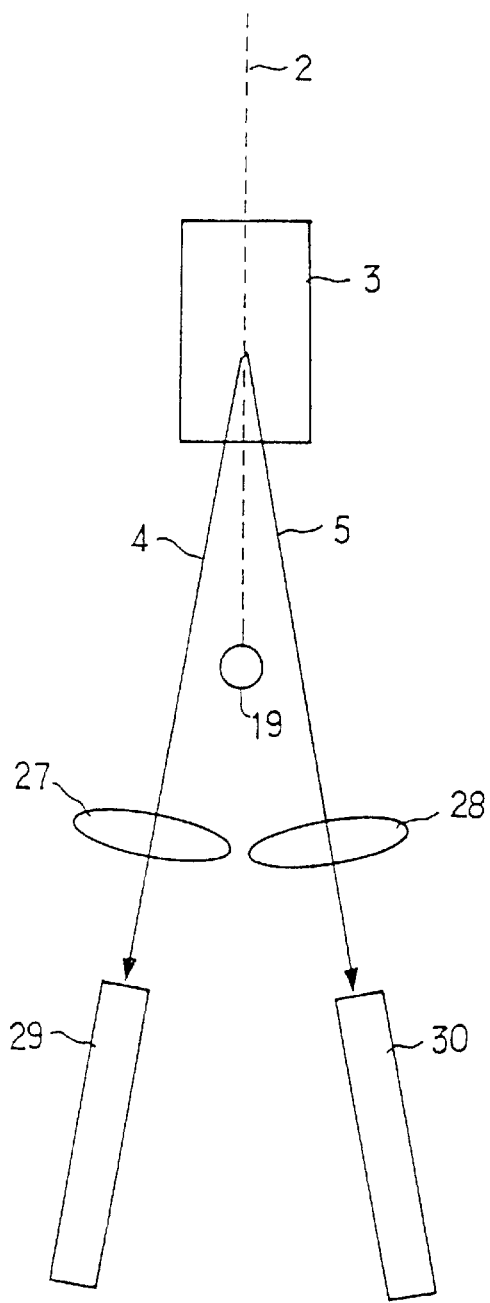
FIG. 11 is a diagram showing the overall configuration of a further embodiment of the photon beam generating apparatus according to the present invention.

FIG. 11 shows a further embodiment of the present invention. In FIG. 11, reference numeral 2 denotes an incident pump beam, 3 denotes a non-linear optical medium, 4 denotes a signal photon beam, 5 denotes an idler photon beam, 27 and 28 denote lenses, and 29 and 30 denote optical fibers. The signal photon beam 4 and the idler photon beam 5 generated upon incidence of the incident pump beam are led into the optical fibers 29 and 30, respectively, through lenses 27 and 28.

Figure 12:
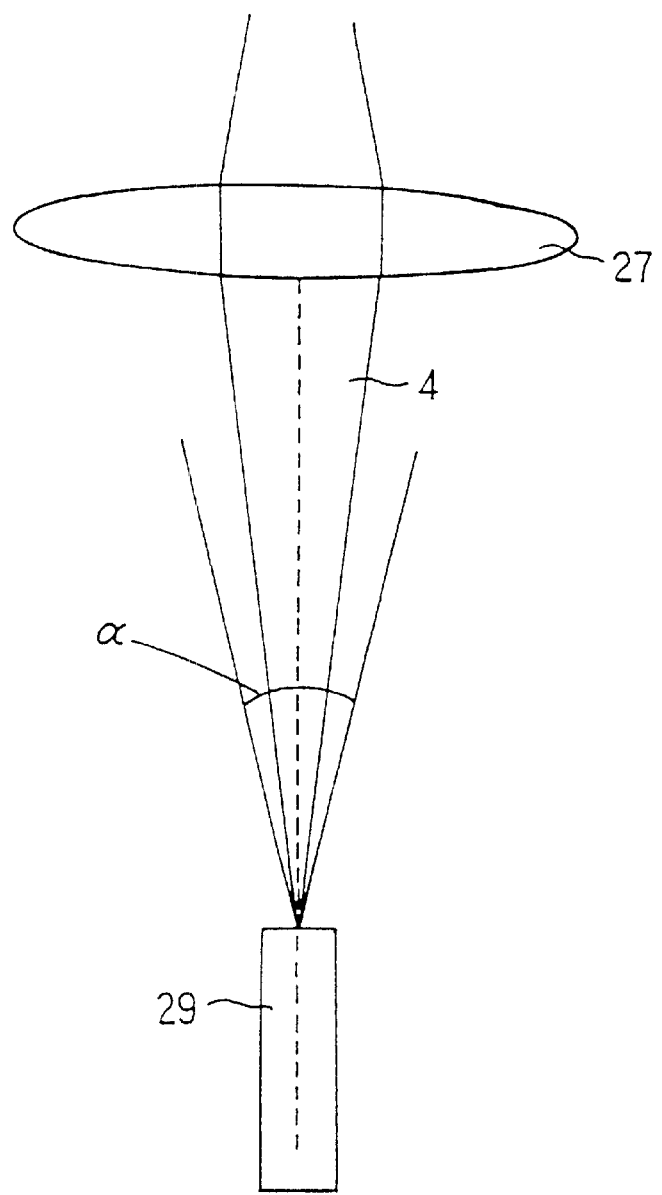
FIG. 12 is an explanatory diagram showing conditions for efficient incidence of a parametric fluorescence beam into an optical fiber.

In order to efficiently lead a photon beam into an optical fiber, the beam must be led to an end face of the fiber at an angle smaller than an angle α determined in accordance with the following equation:

$$NA = n \cdot \sin(\alpha/2) \tag{3}$$

where NA indicates an inherent numerical aperture of the fibers and n is a refractive index of the fiber (core) material. If the incidence angle of the beam is greater than α, the beam does not propagate within the fiber (FIG. 12). However, in a conventional method, since parametric fluorescence light is radiated over a wide angular range, the image thereof on the convergence lens becomes large, resulting in a long distance between the lens and the end face of the fiber.

However, as discussed in conjunction with Embodiment 1, the present invention enables fluorescence light to be generated as a signal beam 4 or an idler beam 5 within a small solid angle. As a result, the image of the fluorescence light on the lens becomes smaller, which enables shortening of the distance between the lens and the end face of the fiber. The apparatus thus becomes compact in size.

(5) Embodiment 5

Figure 13:
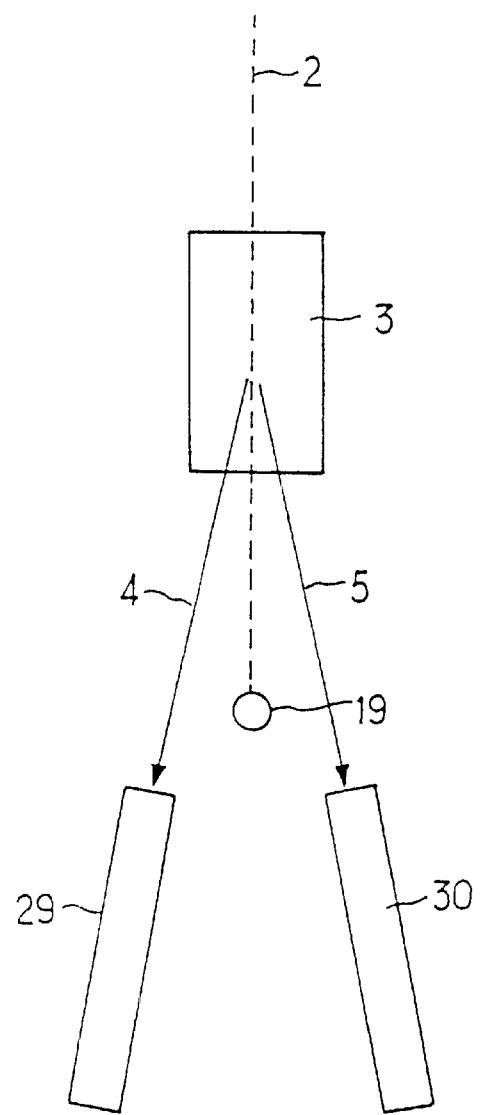
FIG. 13 is a diagram showing the overall configuration of a still further embodiment of the photon beam generating apparatus according to the present invention.
Figure 14:
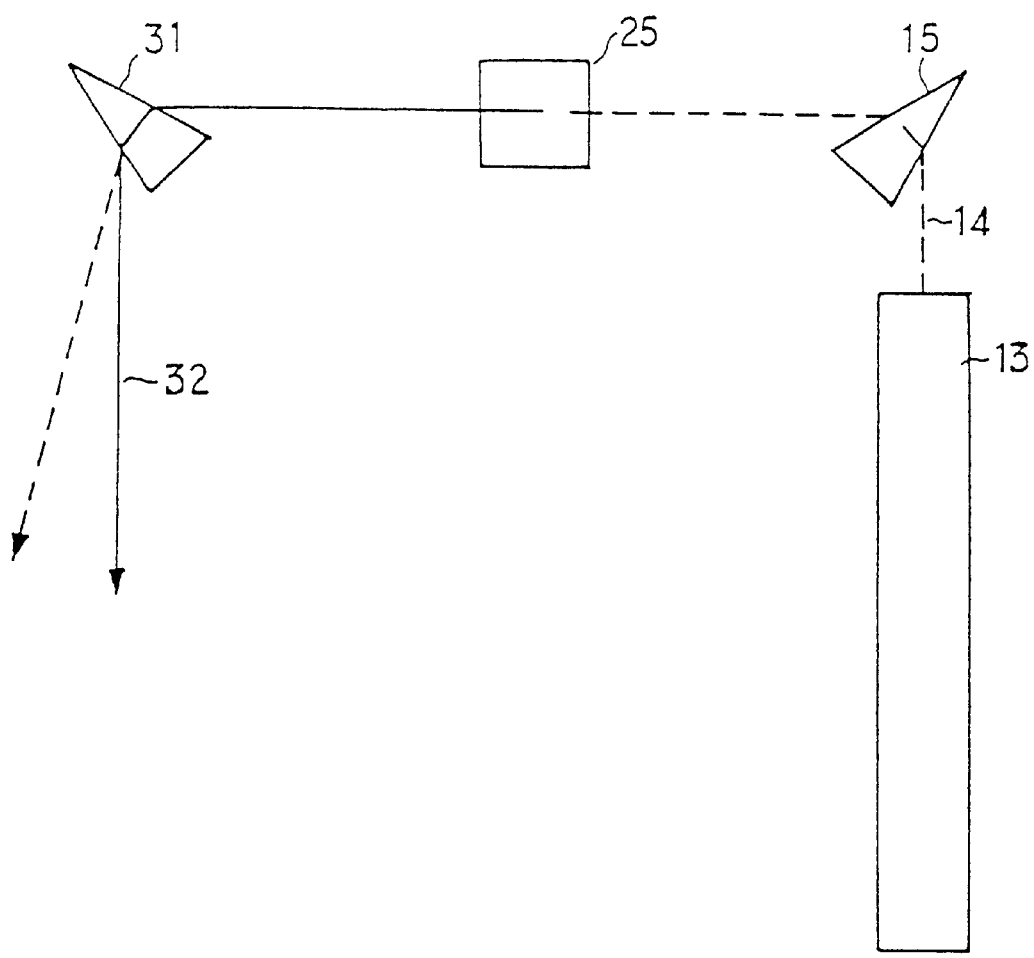
FIG. 14 is a diagram showing the overall configuration of a conventional photon beam generating apparatus.
Figure 15:
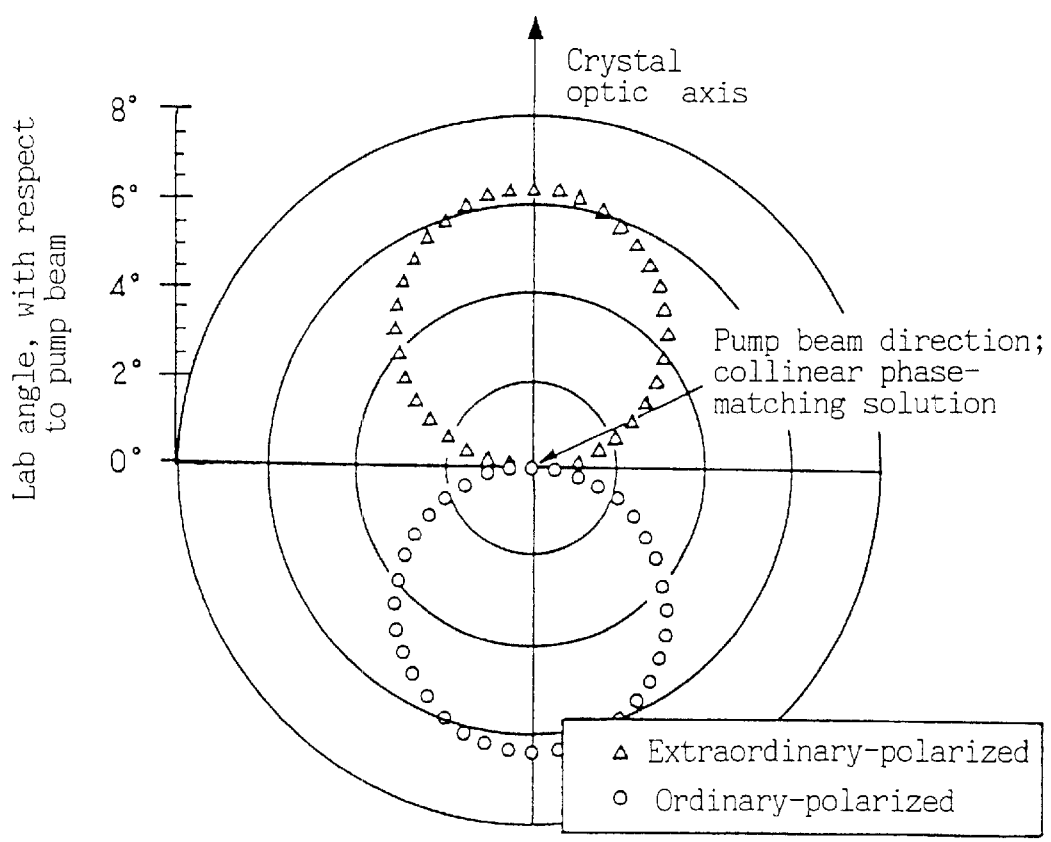
FIG. 15 is a diagram showing the radiation angles of fluorescence light radiated from a conventional photon beam generating apparatus.

FIG. 13 shows yet another embodiment of the present invention. The present embodiment is identical with Embodiment 4 except that the lens 27 and 28 are omitted and the signal and idler photon beams 4 and 5 are led directly into the optical fibers 29 and 30.

In a conventional method, the photon beams are radiated over a wide angular range from the non-linear optical medium. Further, when the distance between the non-linear optical medium and the end faces of optical fibers 29 and 30 is too short, the incident pump beam 2 also enters the fiber, thus increasing noise therein. For these reasons, in the conventional method, it is extremely difficult to efficiently lead the signal photon beam 4 or the idler photon beam 5 directly into the fibers.

However, as has been described in conjunction with the previous embodiment, the present invention enables a fluorescence light to be radiated as a signal photon beam 4 or an idler photon beam 5 within a small angular range. Consequently, if each of the optical fibers 29 and 30 has an appropriate core diameter, each of the photon beams can be led directly into its associated fiber without being passed through the lens. Hence, the apparatus of the present invention becomes compact in size, and time and effort for adjustment of the optical system can be saved.

In FIG. 13, although the end faces of the optical fibers are depicted as being separate from the non-linear optical medium, as a mater of course, these components may be in contact with each other.

(6) Embodiment 6

In a still further embodiment of the present invention, one of the signal and idler photon beams is led into a fiber after it is converged by the use of a lens as in Embodiment 3, and the other beam is led directly into a fiber as in Embodiment 4. For example, in order to obtain a single photon beam whose generator time is determined through detection of an idler photon beam, the idler photon beam is led directly into a multi-mode fiber, which can have a large diameter, since the idler bean is used for detection only and therefore is not required to propagate over a long distance. In contrast, the signal photon beam, which must be transmitted over a long distance as a single photon beam, is led into a single mode fiber which enables long distance transmission. Since the single mode fiber has a small fiber core diameter, the signal beam is input into the fiber by the use of a lens.

INDUSTRIAL APPLICABILITY

As has been described, according to the present invention, as a result of the angle between an optical axis of a non-linear optical medium and an incident pump beam being set to a specific value, there can be produced parametric fluorescence pairs which are radiated within a small angular range and which are therefore easily converted into beams each having a circular or an oval cross-section.

Additionally, there can be generated a single photon beam whose generation time is detected through detection of one of the above beams.

Moreover, since each of the above beams is output within a small angular range, the distance between a convergence lens and an end face of its associated optical fiber can be shortened.

Furthermore, since each of the above beams is output within a small angular range, the beams can be input directly into optical fibers without the use of convergence lenses.

What is claimed is:

1. A photon beam generating apparatus comprising:
   an incident pump beam generation section to generate an incident pump beam; and
   a photon pair generation section including a non-linear optical medium, an angle between an optical axis of the non-linear optical medium and the incident pump beam being set to a value such that tuning curves become tangent to a line corresponding to a wavelength a, wherein the
   photon pair generation section generates two photon beams having different directions which includes paired photons generated simultaneously and having a wavelength a when the incident pump beam is entered therein.

2. A photon beam generating apparatus according to claim 1, further comprising:
   a detection section to detect one of the generated photons constituting the pair, thereby determining time of generation of each photon contained in the generated two photon beams.

3. A photon beam generating apparatus according to claim 1, further comprising:
   two lenses to converge respectively the generated two photon beams; and
   two optical fibers through which the two photon beams propagate respectively.

4. A photon beam generating apparatus according to claim 1, further comprising:
   two optical fibers through which the photon beams generated by the photon pair generation section propagate respectively.

5. A photon beam generating apparatus comprising:
   an incident pump beam generation section to generate an incident pump beam; and
   a photon pair generation section including a non-linear optical medium, an angle between an optical axis of the non-linear optical medium and the incident pump beam being set to a value such that tuning curves become tangent to different lines corresponding to wavelengths a and b respectively,
   wherein the photon pair generation section generates two photon beams having different directions which includes paired photons generated simultaneously and having wavelengths a and b respectively when the incident pump beam is entered therein.

6. A photon beam generating apparatus according to claim 5, further comprising:
   a detection section to detect one of the generated photons constituting the pair, thereby determining time of generation of each photon contained in the generated two photon beams.

7. A photon beam generating apparatus according to claim 5, further comprising:

two lenses to converge respectively the generated two photon beams; and two optical fibers through which the two photon beams propagate respectively.

8. A photon beam generating apparatus according to claim 5, further comprising:

two optical fibers through which the photon beams generated by the photon pair generation section propagate respectively.

9. A photon beam generating apparatus comprising:

an pump beam generator to generate a pump beam; and a photon pair generator generating two photon beams having different directions which includes paired photons generated simultaneously upon incidence of said pump beam, said photon pair generator including a non-linear optical medium, an angle between an optical axis of the non-linear optical medium and the pump beam being set to a value such that a curve representing the relationship between the wavelength of a generated photon beam and the radiation angle between said photon beam radiated from the photon pair generation section with respect to the incident pump beam is tangent to a line corresponding to a wavelength, and the wavelength of said photon beam radiated from the photon pair generation section is said wavelength when the pump beam is incident on said non-linear optical medium.

10. A photon beam generating apparatus according to claim 9, wherein a curve representing the relationship between the wavelength of the other generated photon beam and the radiation angle between said other photon beam radiated from the photon pair generation section with respect to the incident pump beam is tangent to a line corresponding to another wavelength, and the wavelength of said other photon beam radiated from the photon pair generation section is said another wavelength when the pump beam is incident on said non-linear optical medium.

11. A photon beam generating apparatus according to claim 10 further comprising:

a detection section to detect one of the generated photons constituting the pair, thereby determining time of generation of each photon contained in the generated two photon beams.

12. A photon beam generating apparatus according to claim 10, further comprising:

two lenses to converge respectively the generated two photon beams; and two optical fibers through which the two photon beams propagate respectively.

13. A photon beam generating apparatus according to claim 10, further comprising;

two optical fibers through which the photon beams generated by the photon pair generation section propagate respectively.

14. A photon beam generating apparatus according to claim 9, further comprising:

two lenses to converge respectively the generated two photon beams; and two optical fibers through which the two photon beams propagate respectively.

15. A photon beam generating apparatus according to claim 9, wherein a curve representing the relationship between the wavelength of the other generated photon beam and the radiation angle between said other photon beam radiated from the photon pair generation section with respect to the incident pump beam is tangent to a line corresponding to said wavelength, and the wavelength of said other photon beam radiated from the photon pair generation section is said wavelength when the pump beam is incident on said non-linear optical medium.

16. A photon beam generating apparatus according to claim 9, further comprising:

two optical fibers through which the photon beams generated by the photon pair generation section propagate respectively.

17. A photon beam generating apparatus according to claim 9, further comprising:

detection section to detect one of the generated photons constituting the pair, thereby determining time of generation of each photon contained in the generated two photon beams.

* * * * *